United States Patent [19]

Banakis et al.

[11] Patent Number: 5,481,434
[45] Date of Patent: Jan. 2, 1996

[54] MEMORY CARD AND FRAME FOR ASSEMBLY THEREFOR

[75] Inventors: Emanuel G. Banakis, Naperville; Donald J. Brinkman, Woodridge; Kenneth F. Janota, Lisle; Harold K. Lang, Fox River Grove, all of Ill.

[73] Assignee: Molex Incorporated, Lisle, Ill.

[21] Appl. No.: 131,797

[22] Filed: Oct. 4, 1993

[51] Int. Cl.⁶ ............... H05K 1/14; H05K 5/02; H05K 7/14
[52] U.S. Cl. ............. 361/756; 361/736; 361/737; 361/741; 361/752; 361/796; 361/802; 361/829
[58] Field of Search .................. 235/492, 495, 235/487; 257/678, 679; 361/684, 728, 730, 737, 752, 758, 759, 790, 796, 804, 802, 732, 736, 740, 741, 742, 747, 756, 801, 802; 439/68, 69, 74

[56] References Cited

U.S. PATENT DOCUMENTS

| | | | |
|---|---|---|---|
| 4,459,640 | 7/1984 | Latasiewicz et al. | 361/752 |
| 4,533,976 | 8/1985 | Suwa | 361/684 |
| 4,905,124 | 2/1990 | Banjo et al. | 361/737 |
| 5,038,250 | 8/1991 | Uenaka et al. | 361/737 |
| 5,061,845 | 10/1991 | Pinnavaia | 361/684 |
| 5,111,362 | 5/1992 | Flamm et al. | 361/737 |
| 5,144,533 | 9/1992 | Annett | 361/759 |
| 5,154,631 | 10/1992 | Belanger, Jr. | 361/741 |
| 5,173,841 | 12/1992 | Uenaka et al. | 361/737 |

FOREIGN PATENT DOCUMENTS

| | | | |
|---|---|---|---|
| 1926328 | 11/1970 | Germany | 361/752 |
| 2-27796 | 1/1990 | Japan | 361/752 |
| 4161392 | 6/1992 | Japan . | |

Primary Examiner—Donald A. Sparks
Attorney, Agent, or Firm—Stacey E. Caldwell

[57] ABSTRACT

A memory card which includes a circuit substrate having a generally planar surface, comprises a frame with an opening in one of a top or a bottom wall thereof for receiving the circuit substrate. A support structure on the frame supports the circuit substrate within the card. A cover closes the opening and encloses the circuit substrate and the electrical component within the internal card space created by the frame and cover. The support structure of the frame includes a plurality of shelves at different vertical locations within the frame to support the circuit substrate at different vertical levels to accommodate varying heights of electrical components mounted on one or both surfaces of the substrate. The circuit substrate includes a peripheral edge area with cutouts corresponding to only one of the shelves whereby only the periphery of the substrate need be modified for locating and supporting the circuit substrate at different levels within the card.

4 Claims, 5 Drawing Sheets

MEMORY CARD AND FRAME FOR ASSEMBLY THEREFOR

FIELD OF THE INVENTION

This invention generally relates to the art of IC cards and, particularly, to a memory card which has a frame for supporting circuit substrates therewithin at different levels to accommodate different configurations of electrical components on the substrate.

BACKGROUND OF THE INVENTION

Generally, IC cards, such as memory cards, are data input devices which are electrically connected to an electronic apparatus or storage device, such as a word processor, personal computer or other electronic apparatus. The data or memory stored in the card is transferred to the electronic apparatus. Typically, the cards are portable instruments which are readily insertable and extractable from a connector apparatus used for removably coupling the card to a printed circuit board of the underlying electronic apparatus.

A memory card conventionally includes a frame which is generally rectangular and may include an opening in either a top surface or a bottom surface thereof or, in most constructions, in both surfaces. The opening receives a circuit substrate, and a panel or cover closes the opening and encloses the circuit substrate within the frame.

The circuit substrate of the memory card typically has a generally planar surface with at least one electrical component mounted thereon. The electrical component(s) may include semi-conductor devices, integrated circuits, batteries or the like. Such components extend or project vertically a given height off the substrate surface. Consequently, it has been common practice to design the frame of the memory card with support means for supporting the circuit substrate at particular vertical heights or levels within the frame to accommodate the different heights of electrical components. The substrates are "offset" toward the top cover or bottom cover to make "headroom" for the components. In other words, the circuit substrate must be supported within the frame so that the electrical components on the substrate do not project out of the frame or beyond the internal card space created by the cover or panel. This criteria further is complicated when different size electrical components are mounted on both sides of the circuit substrate.

Therefore, it can be understood that different frames have to be manufactured with different "offsets" to receive and support circuit substrates having electrical components of varying heights mounted thereon, or circuit substrates which have components mounted on both sides of the substrate, notwithstanding the fact that the overall dimensions of the frame, circuit substrate and cover remain constant. In fact, the outside dimensions of the memory card normally are defined by the outside dimensions of the frame, and these dimensions may be limited by conformance requirements to particular specifications or standards, such as those defined by the Personal Computer Memory Card International Association (PCMCIA). The electrical components, however, are not so specified. A problem, therefore, with the manufacture and assembly of a memory card is that the frame of any given memory card must be customized for the particular circuit substrate design due to the different offsets required, and therefore each frame with its respective offset must be correspondingly inventoried as a separate component, which is not very cost effective.

This invention is directed to providing a memory card with an adaptable frame which can mount circuit boards at different levels within the frame to accommodate electrical components of different heights on the circuit substrate and to accommodate circuit substrates with components on one or both sides thereof. Therefore, frame manufacturers and users need only manufacture and inventory one frame rather than several, thus providing a significant cost savings. The invention contemplates that the circuit substrate be slightly modified, as described herein, however, since the circuit substrate typically is a customized part of the memory card for each application, additional costs are minimized, if present at all.

SUMMARY OF THE INVENTION

An object, therefore, of the invention is to provide a new and improved memory card of the character described, the memory card having an adaptable frame for receiving and supporting circuit substrates at different vertical locations therewithin to accommodate different heights of electrical components mounted thereon.

In the exemplary embodiment of the invention, a memory card is disclosed as including a circuit substrate having a generally planar surface with at least one electrical component mounted thereon. The component projects a given vertical distance from the substrate. The memory card further comprising a frame with an opening in one of a top or a bottom surface thereof for receiving the circuit substrate. Support means are provided on the frame, facing the opening, for supporting the circuit substrate thereon. A panel or cover closes the opening and substantially encloses the circuit substrate.

The invention contemplates that the support means of the frame define shelves or platforms at different locations within the frame for supporting a circuit substrate at different vertical levels to accommodate, within the frame and cover package, electrical components of various heights and components mounted on both sides of the substrate. A portion of the planar surface of the circuit substrate actually engages the support means, whereby only the periphery of the substrate need be modified for locating and supporting the entire circuit substrate at different "levels" within the frame.

As disclosed herein, the supporting shelves are located at a periphery of the opening in the frame for engaging the circuit substrate at a peripheral edge thereof. The substrate includes a peripheral edge configuration or shape for engaging only one of the shelves depending on the maximum distance an electrical component projects off the substrate. In the preferred embodiment, the shelves define a stepped configuration at the periphery of the opening in the frame, and a peripheral edge of the substrate is cut-out or notched so that the peripheral edge engages the shelf or platform which corresponds closest to the maximum height of the electrical components on the circuit substrate without allowing the component to touch the cover.

Another object of the invention is to provide a new and improved method of assembling the memory card of the character described. The method described herein comprises the steps of: determining the height of the electrical component; determining the distance between a first support shelf within the frame and the cover; determining the distance between a second support shelf within the frame and the cover; comparing the distance between the first support shelf and the cover and the second support shelf and the cover; determining whether the distance between the first support shelf and the cover or the second support shelf and the cover more closely accommodates the height of the electrical component without allowing the component to touch the cover; notching or cutting out a circuit substrate along a peripheral edge thereof so that it is configured to engage and be supported by the support shelf selected to accommodate the electrical component; fixedly coupling the electrical component to the circuit substrate; fixedly coupling the connector to the circuit to produce a circuit assembly; mounting the circuit assembly to the frame to produce a frame assembly; and attaching the cover to the frame assembly.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
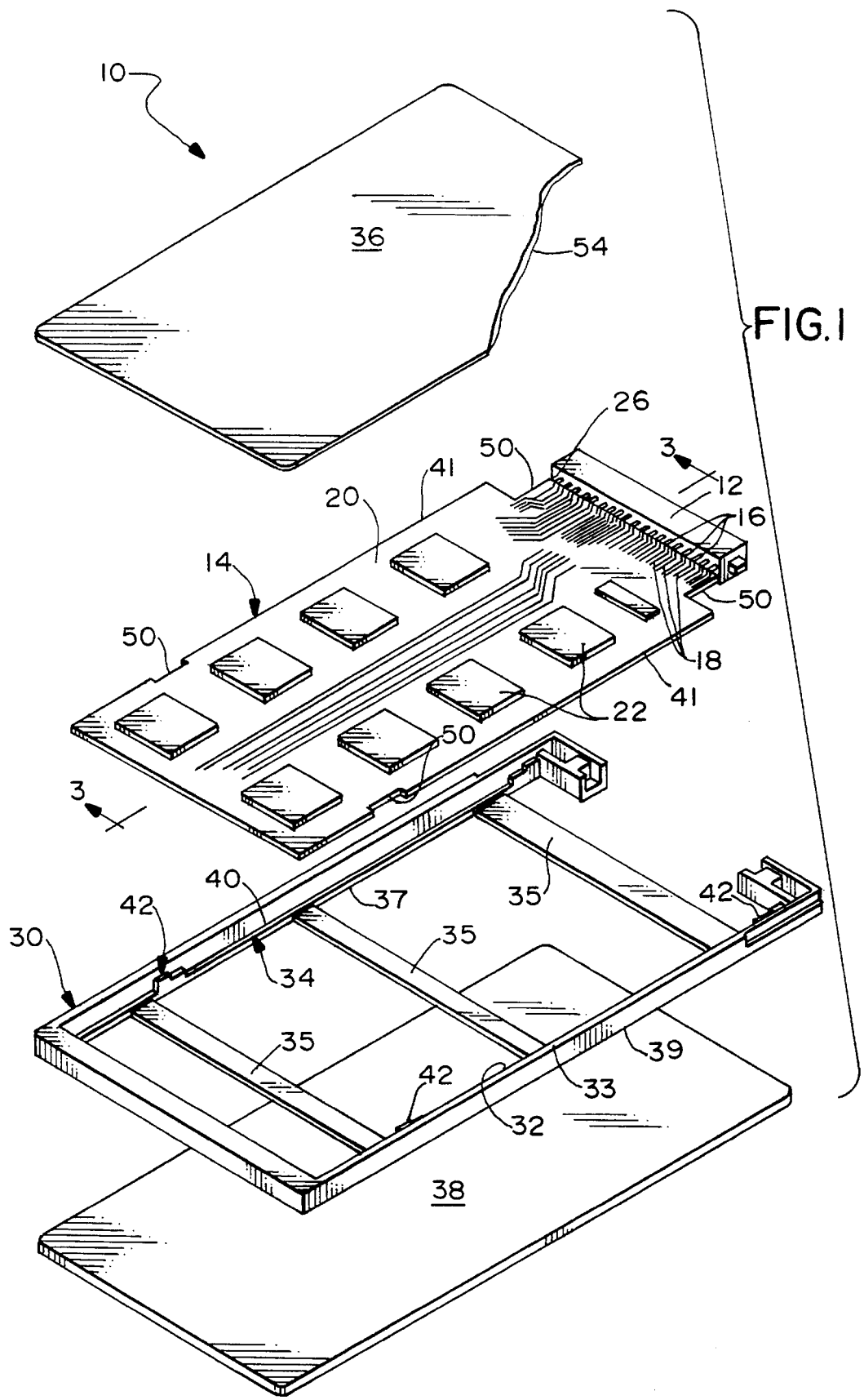
FIG. 1 is an exploded perspective view of the elements of an IC or memory card embodying the concepts of the invention.

Referring to the drawings in greater detail, and first to FIG. 1, the invention is embodied in a memory card, generally designated 10, which is provided as a memory input device for connection to an electronic apparatus or storage device, such as a word processor, personal computer or other electronic apparatus (not shown). The data stored in memory card 10 is transferred to the electronic apparatus through the terminals within a receptacle 12 which is edge mounted to a circuit substrate, generally designated 14.

Receptacle 12 is elongated and mounts a plurality of input terminals 16. The terminals mechanically and electrically engage contact pads 18 on a surface 20 of circuit substrate 14. Various electrical components or circuit elements 22 are mounted on surface 20 of substrate 14, and electrically coupled to circuit traces 24 leading to contact pads 18 at the leading or front edge 26 of the substrate. This edge is coupled to elongate receptacle 12, and the receptacle is interconnectable with an electrical connector apparatus, such as a header connector on a printed circuit board of the electronic apparatus to which data of memory stored in circuit substrate 14 is transferred.

The above description of circuit substrate 14 is generally conventional, and, consequently, the depiction of the circuit board is somewhat schematic. However, it should be understood that, although electrical components 22 are shown in the drawings as being similarly shaped and of uniform height, the components may actually comprise semi-conductor devices, memory chips, batteries, integrated circuits, or other components of different shapes and sizes and which extend or project different vertical distances or heights off surface 20 of circuit substrate 14.

Still referring to FIG. 1, memory card 10 includes a frame, generally designated 30, which includes an opening 32 in a top surface or wall 33 thereof for receiving circuit substrate 14. The frame includes support means, generally designated 34, facing opening 32 for supporting circuit substrate 14 within the frame in the orientation of FIG. 1. A top panel or cover 36 is secured to top wall 33 of the frame for closing opening 32 and for substantially enclosing circuit substrate 14 and receptacle 12 within frame 30. The frame is unitarily molded of dielectric material, such as plastic, and a plurality of cross braces 35 join the sides of the frame to provide structural integrity to the frame. In the illustrated embodiment, the frame also defines a bottom opening 37 in a bottom wall 39 of frame 30, which is closed by a bottom panel or cover 38.

Generally, the invention contemplates the provision of support means 34, which define a plurality of platforms or shelves at different locations within frame 30, for supporting circuit substrate 14 at different vertical levels or heights within the frame. In other words, the circuit substrate is supported at different vertical distances from opening 32 or cover 36 to accommodate varying heights of electrical components 22 mounted on substrate 20 within the internal card space created by the frame and cover. In other words, the support means allows frame 30 to be an adaptable element of memory card 10 by supporting different circuit substrates which may have electrical components projecting different heights off the surface of the substrate.

Figure 2:
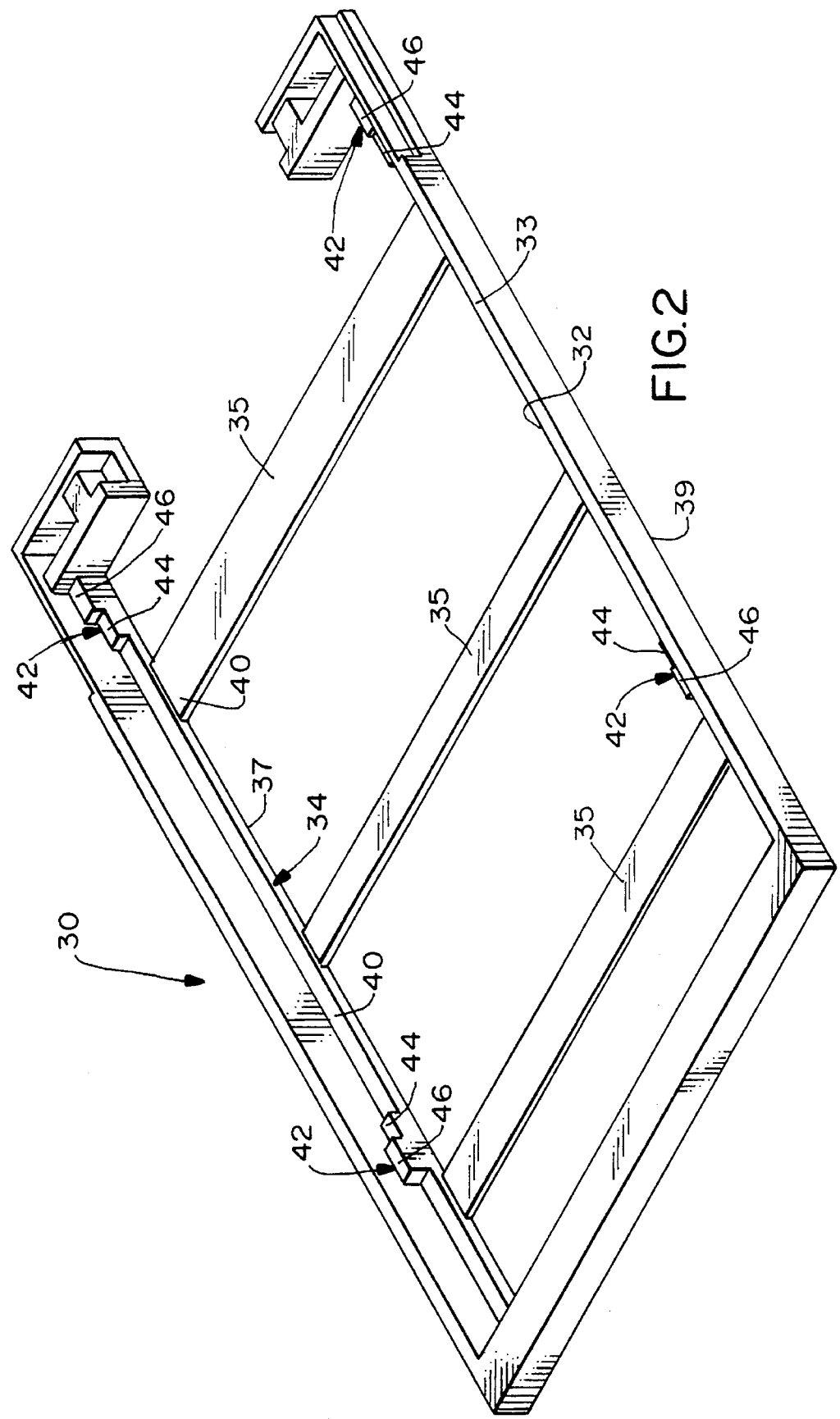
FIG. 2 is a perspective view of the frame element of the memory card.
Figure 3:
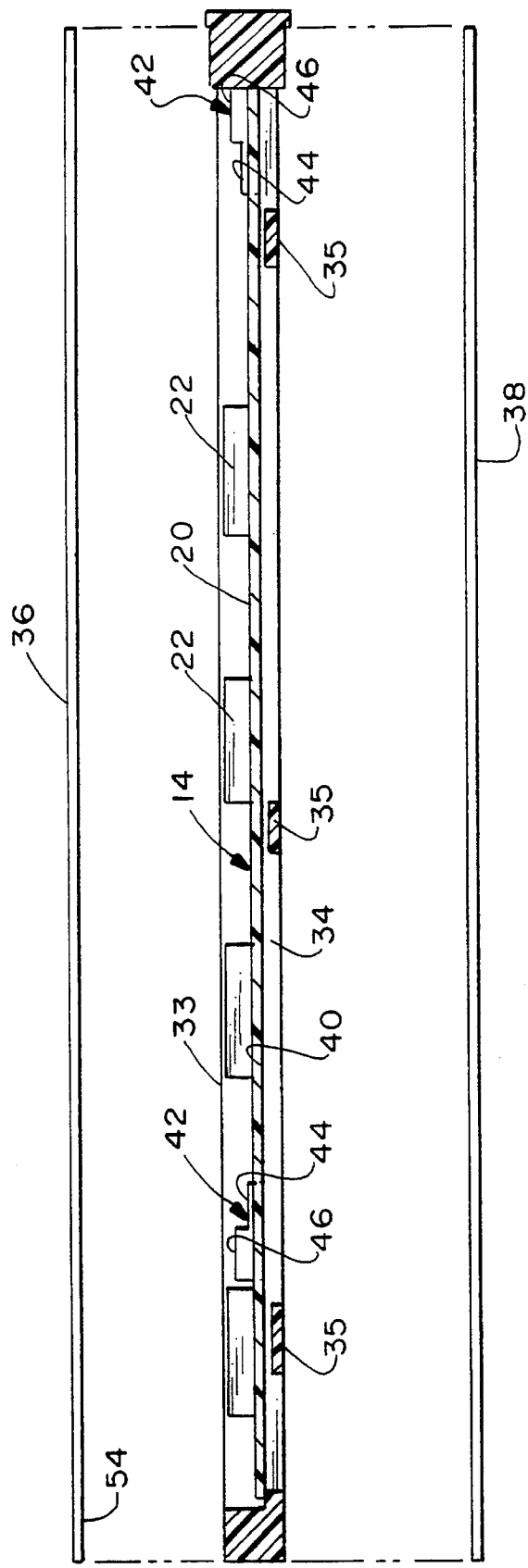
FIG. 3 is a vertical section, taken generally along line 3—3 of FIG. 1, with the circuit substrate received in the frame, and the top and bottom panels isolated to facilitate the illustration.
Figure 4:
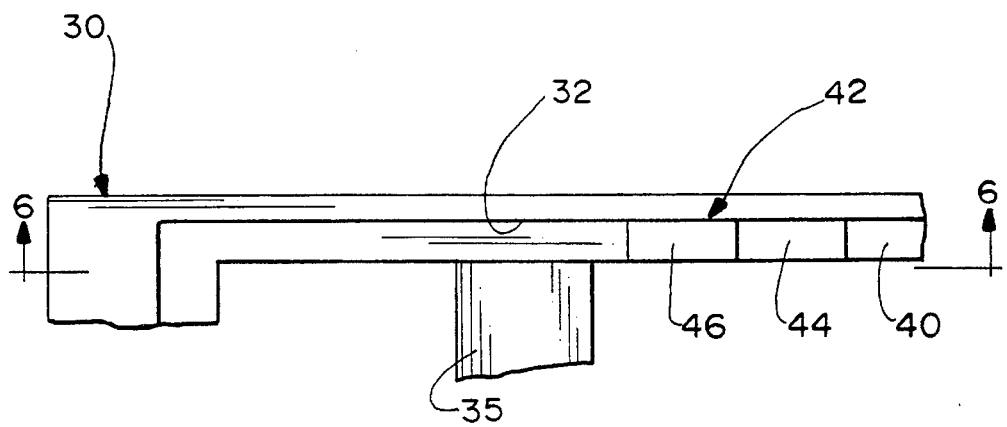
FIG. 4 is an enlarged, fragmented top plan view of one of the supporting shelf areas of the frame.
Figure 6:
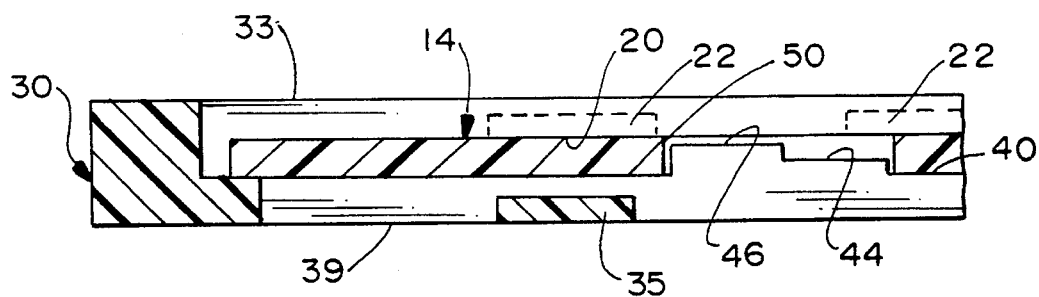
FIG. 6 is a vertical section taken generally along line 6—6 of the frame in FIG. 4 with the circuit substrate of FIG. 5 supported thereon.

More particularly, referring to FIG. 2 in conjunction with FIG. 1, support means 34 on frame 30 includes a lower platform or shelf 40 which extends substantially along opposite sides of the frame at the periphery of opening 32. Side edges 41 (FIG. 1) of circuit substrate 14 are supported at a "lower" level within the frame on this shelf 40. Therefore, shelf 40 will define the supported location of circuit substrate 14 which is a maximum distance from top surface 33 of frame 30 and, correspondingly, the maximum distance which any given electrical component 22 can project from surface 20 and still allow cover 36 to close opening 32 and enclose the circuit substrate within the frame without allowing the component to touch a top inside surface 54 of cover 36.

As seen clearly in FIG. 2, support means 34 includes a plurality (four) of stepped configurations, generally designated 42, which define additional platforms or shelves for supporting circuit substrate 14 at additional or different vertical levels within frame 30. More particularly, each stepped configuration 42 defines an "intermediate" level platform or shelf 44 and a "top" level platform or shelf 46. The intermediate shelves 44 of all four stepped configurations 42 are in a common plane or "level" within frame 30 and, likewise, shelves 46 of all four stepped configurations 42 are coplanar or at the same level within the frame.

The result of providing an adaptable frame 30 with a support means 34, including the three different levels of shelves 40, 44 and 46, is that various circuit substrates 14 can be supported within frame 30 at three different vertical levels without making any modifications to frame 30. The only modifications necessary are minor and are made to peripheral edges 41 (FIG. 1) of substrate 14, as described below.

Specifically, it can be seen in FIG. 1 that circuit substrate 14 has four cut-outs or notches 50, the notches being located generally coincident with stepped configurations 42 of frame 30. Depending upon the existence and/or size of notches 50, circuit substrate 14 can be supported within frame 30 at different "levels", as described above. Since circuit substrate 14 is a customized element of memory card 10, providing notches 50 in substrate 14 is a relatively minor operation in comparison to the overall manufacturing costs of the memory card.

The function of notches 50 can be seen best in FIGS. 1 and 3–6 wherein the notches are of maximum size so that stepped configurations 42, including shelves 44 and 46, project entirely into the notches. With the notches being of maximum size, circuit substrate 14 rests entirely on lower shelves 40 along opposite sides of opening 32, while intermediate shelves 44 and top shelves 46 of stepped configurations 42 project entirely into the notches. This lowermost location of circuit substrate 14 is shown most clearly in FIGS. 3 and 6, wherein stepped configurations 42 are seen to project into notches 50, while substrate 14 is supported on shelves 40.

Figure 8:
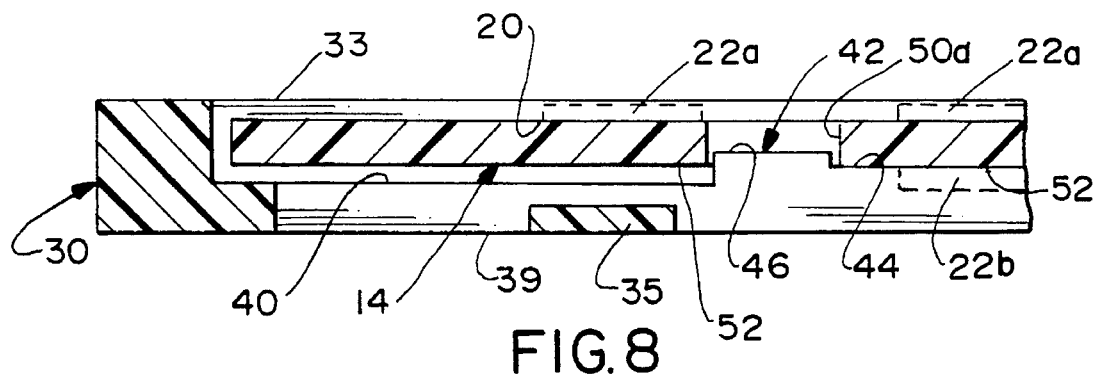
FIG. 8 is a view similar to that of FIG. 6, but illustrating the circuit substrate of FIG. 7 supported within the frame.
Figure 7:
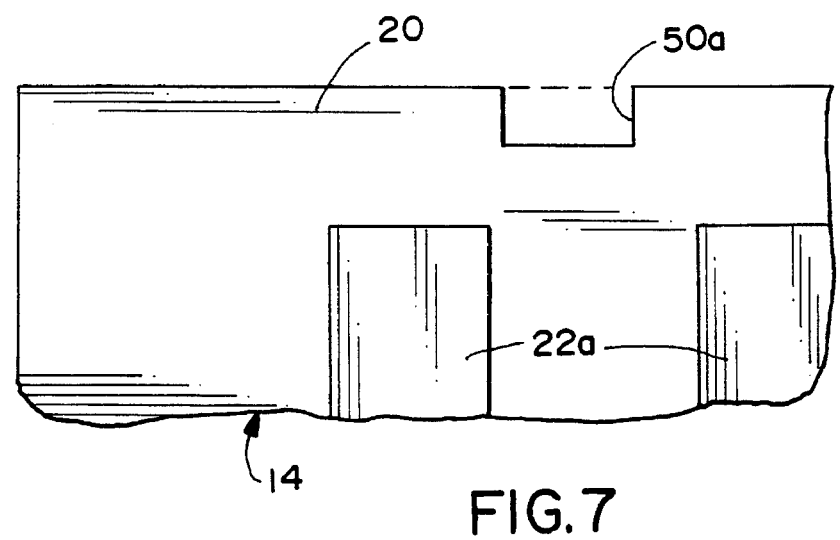
FIG. 7 is a view similar to that of FIG. 5, with the peripheral edge of a circuit substrate cut-out to support the substrate at an intermediate level within the frame.

Now, referring to FIGS. 7 and 8, it can be seen that thinner circuit components 22a (shown as dotted or phantom lines) are mounted on surface 20 or the top surface of substrate 14, and additional circuit components 22b are mounted on an opposite or bottom surface 52 of the substrate. Therefore, substrate 14 has a notch 50a (FIGS. 7 and 8) of a smaller size than notches 50 (FIGS. 1, 3, 5 and 6). Notch 50a is of a size for allowing upper shelf 46 to project thereinto, while circuit substrate 14 rests upon intermediate shelf 44 of stepped configuration 42. Four such notches 50a are provided for registry with stepped configurations 42. It can be seen that the substrate now is spaced above lower shelf 40. This location of circuit substrate 14 in FIGS. 7 and 8 is considered the "intermediate" level of the circuit board. In other words, the circuit board has a different "offset" from that shown in FIGS. 1 and 6.

Figure 9:
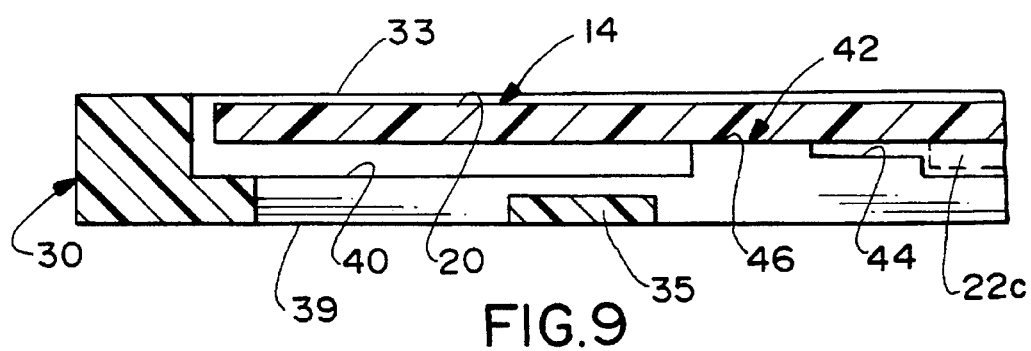
FIG. 9 is a view similar to that of FIGS. 6 and 8, but showing a circuit substrate with no cut-out area supported at the upper level within the frame.

Lastly, referring to FIG. 9, circuit substrate 14 has no circuit components mounted on surface 20 of substrate 14, but relatively large components 22c (shown again in phantom) are mounted on the opposite or bottom surface 52 of the substrate. Therefore the circuit substrate is shown to be supported on top shelves 46 of stepped configurations 42. Edge 41 of circuit substrate 14 is void of any notches, so that the peripheral edges 41 of the substrate is continuous, shown as the dotted lines in FIGS. 5 and 7, and rests on upper shelves 46. This location defines the uppermost supporting "level" of circuit substrate 14 within frame 30. In other words, the circuit substrate has a different "offset" from that shown in FIG. 6, and also from that shown in FIG. 8.

From the foregoing, it can be understood that support means 34, including shelves 40, 44 and 46, of frame 30 allows the frame to be an adaptable element of memory card 10 in order to receive and support three different circuit substrates 14 with their respective electrical components at three different vertical levels within the frame. It should be understood that the concepts of the invention are intended to encompass embodiments beyond this specific exemplary embodiment. The invention, generally, contemplates the provision of a common frame having variable support means for supporting circuit boards or circuit substrates at varying locations or offsets within the frame in order to accommodate different sizes or heights of electrical components on the surface of the circuit substrate. Manufacturers of such a frame for IC card and memory card applications can save considerable costs in not having to tool-up different frame configurations, and therefore reduce inventory costs. The user of the frames also can avoid such inventory costs. Since the circuit substrate must be customized for any given application in the first instance, customizing the interengaging means (i.e. providing notches 50 or 50a in peripheral edges 41 if necessary), is a relatively insignificant cost for adapting the circuit substrates to the variable support means of the frame.

If circuit substrate surface area or real estate is desired to be maximized, the invention also contemplates that the different levels or stepped configurations be frangible, and the individual levels or shelves be removed from the frame in order to support a circuit substrate at any level, thereby avoiding the notching in a peripheral edge of the substrate.

The invention further contemplates a method of assembling memory card 10 described above. The method first contemplates the designing of circuit substrate 14 for the specific application by choosing one or more of a plurality of electrical components 22 to be mounted, typically surface mounted, to the substrate surface 20. Depending on the application, the electrical components may be mounted on one or both surfaces of circuit substrate 14. The electrical components will each have a height projecting off their respective mounting surface. The component with the greatest height off its respective surface will provide a maximum overall dimension which must be accommodated within the internal card space created by the frame and cover. In addition, the substrate itself has a thickness dimension. Therefore, and describing the one-sided circuit substrate shown in FIGS. 3 and 6, the height of the largest (highest) electrical component is first measured. This measurement is added to the thickness dimension of circuit substrate 14.

Figure 5:
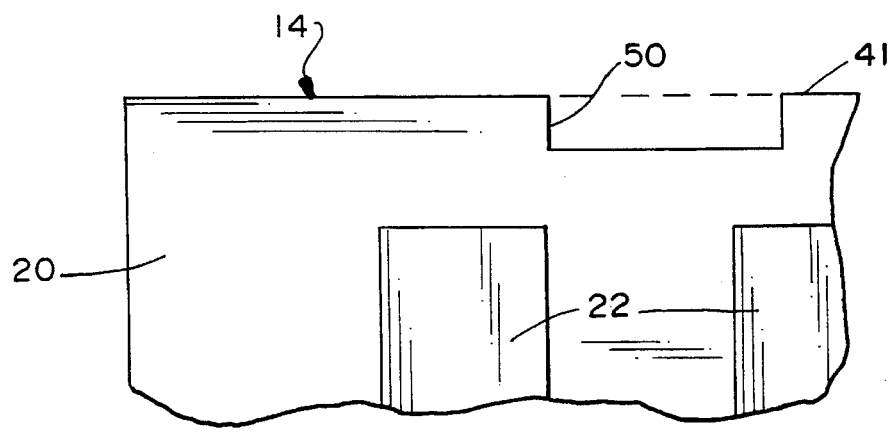
FIG. 5 is a fragmented top plan view of the cut-out area of a circuit substrate for supporting the substrate at the lowest level within the frame.

Next, the internal card space or "headroom" is measured, that is, the internal card space created by frame 30 and cover 36 which accommodates circuit substrate 14. Depending on the level or shelf upon which the circuit substrate is supported within the frame, the height of the electrical components may not fit within such internal card space. To determine which level upon which to position the circuit substrate, first, the distance from the surface of the lowest shelf 40 to the top inside surface 54 of cover 36 is measured. Similarly, distances from the surface of the intermediate and top shelves, 44 and 46, to the top inside surface of the cover are also measured. These measurements will yield three different internal card space dimensions within the memory card in which to accommodate the electrical components and the circuit substrate. These shelf-to-cover dimensions are then compared to the maximum height of the electrical components to be mounted on the circuit substrate plus the circuit substrate thickness dimension itself. The dimension which more closely accommodates the height of the electrical component without allowing the component to touch top inside surface 54 of cover 36 is then chosen. Accordingly, the peripheral edges 41 of circuit substrate 14 are notched or cut-out, if necessary, to correspond to the shelf which was chosen, as shown in FIGS. 5, 7 and 9, to allow the circuit substrate to be supported within the frame at an appropriate location, i.e. to be accommodated within the internal card space created by the frame and cover. Alternatively, the sets of shelves not chosen may be broken off or otherwise removed.

To complete the memory card assembly, electrical components 22 and receptacle connector 12 are surface mounted to the circuit substrate to produce a circuit substrate assembly. The circuit substrate assembly is then mounted within frame 30, supported on the shelf that accommodates the electrical components within the internal card space without contacting the cover. The resultant frame assembly, i.e. the frame and circuit substrate assembly, then receives the cover, substantially enclosing the circuit substrate assembly, which cover is attached to a portion of the frame. The memory card, finally assembled, is thus ready to use.

The procedure described above can be used in applications where one or both surfaces of the circuit substrate mounts electrical components. Thus an appropriate dimension or shelf is chosen which accommodates the height of the components off of both of the substrate surfaces. Furthermore, more shelves may be provided within the frame to provide for design flexibility of the circuit substrate and electrical component height and size variations, i.e. in addition to those shown in FIGS. 2, 6, 8 and 9.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An adaptable memory card frame for supporting only one of a plurality of generally uniformly dimensioned circuit substrates in an opening thereof, comprising:

a set of first support means defined by a first set of shelves integrally formed on the frame at a periphery of the opening and on opposite sides thereof for supporting a first one of the plurality of circuit substrates a first vertical distance from one of a top and bottom surface of the frame, a set of second support means defined by a second set of shelves integrally formed on the frame at the periphery of the opening and on opposite sides thereof for supporting a second one of the plurality of the circuit substrates a second vertical distance from the surface, wherein the first one of the plurality of circuit substrates includes a first peripheral edge area having cutouts with a first configuration corresponding to the first set of shelves which allow only the first circuit substrate to be supported on the first set of shelves at said first vertical distance from the surface of the frame, and the second one of the plurality of circuit substrates includes a second peripheral edge area having cutouts with a second configuration corresponding to the second set of shelves which allow only the second circuit substrate to be supported on the second set of shelves at said second vertical distance from the surface of the frame, whereby the frame accepts only one of the first circuit substrate and the second circuit substrate at a given time for a given memory card assembly.

2. A memory card frame as set forth in claim 1, said first and second circuit substrate further comprising conductive traces printed on the one of the surfaces of the circuit substrate, wherein a receptacle connector, having conductive terminals mounted therein, is coupled to the conductive traces of the circuit substrates.

3. A memory card frame as set forth in claim 1, the frame further comprising an opening in one of a top and a bottom wall for receiving one of the first and second circuit substrates, wherein a cover member covers the opening in said wall.

4. A memory card frame as set forth in claim 1, further comprising a set of third support means defined by a third set of shelves integrally formed on the frame at the periphery of the opening and on opposite sides thereof for supporting a third one of the plurality of circuit substrates a third vertical distance from the surface of the frame.

* * * * *